United States Patent
Ohwaki et al.

(10) Patent No.: US 6,529,223 B2
(45) Date of Patent: Mar. 4, 2003

(54) IMAGE FORMING APPARATUS WITH LIGHT BEAM CONTROL

(75) Inventors: Hironori Ohwaki, Shizuoka (JP); Toshiyuki Ehara, Kanagawa (JP); Masaya Kawada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/866,788

(22) Filed: May 30, 2001

(65) Prior Publication Data

US 2002/0008754 A1 Jan. 24, 2002

(30) Foreign Application Priority Data

Jun. 1, 2000 (JP) .......................... 2000-164948

(51) Int. Cl.$^7$ ............................................. G03G 15/00
(52) U.S. Cl. .......................................... 347/133; 399/48
(58) Field of Search .................... 347/129, 131, 347/132, 133; 399/48

(56) References Cited

U.S. PATENT DOCUMENTS 6,240,269 B1    5/2001    Kaya et al. ................ 399/128
6,333,755 B1 *  12/2001   Ehara et al. ............... 347/129

FOREIGN PATENT DOCUMENTS

JP          11-183542       7/1999

\* cited by examiner

Primary Examiner—Joan Pendegrass
(74) Attorney, Agent, or Firm—Fitzpatrick, Cella, Harper & Scinto

(57) ABSTRACT

An object of the present invention is to provide an image forming apparatus that has an image bearing body, charging device for charging the image bearing body, and exposing device for exposing the image bearing body charged by the charging device, wherein the exposing device illuminates a light beam for each of pixels corresponding to a non-imaged portion of a pixel matrix having plural rows and plural columns, and wherein, when it is assumed that a width of one pixel in the pixel matrix is A and a distribution width in a half value of a maximum potential value of potential distribution formed in OFF of light beam illumination of one pixel is Wv, a following relationship is satisfied:

$$0.6 \leq Wv/A \leq 1.4.$$

8 Claims, 9 Drawing Sheets

FIG. 9

| | Wv/A | Wv/We | PHOTO-SENSITIVE BODY | LIGHT SOURCE | FOG | SLIM LINE IMAGE OF LINE | OPTICAL MEMORY | OVERALL DECISION |
|---|---|---|---|---|---|---|---|---|
| EXAMPLE 1 | 1.0 | 0.7 | a-Si | LASER | EXCELLENT | EXCELLENT | EXCELLENT | EXCELLENT |
| EXAMPLE 2 | 1.1 | 0.9 | OPC | LASER | EXCELLENT | GOOD | GOOD | GOOD |
| EXAMPLE 3 | 1.0 | 0.7 | a-Si | LED | GOOD | GOOD | GOOD | GOOD |
| COMPARATIVE EXAMPLE 1 | 0.4 | 0.7 | a-Si | LASER | FAIL | EXCELLENT | EXCELLENT | FAIL |
| COMPARATIVE EXAMPLE 2 | 1.5 | 0.7 | a-Si | LASER | EXCELLENT | FAIL | EXCELLENT | FAIL |
| COMPARATIVE EXAMPLE 3 | 1.0 | 1.8 | a-Si | LASER | EXCELLENT | EXCELLENT | FAIR | FAIR |

| | CONTROL OF LATENT IMAGE POTENTIAL DISTRIBUTION | FOG DENSITY | SLIM LINE IMAGE OF LINE | OPTICAL MEMORY | OVERALL DECISION |
|---|---|---|---|---|---|
| EXAMPLE 4 | EFFECTED | EXCELLENT | EXCELLENT | EXCELLENT | EXCELLENT |
| COMPARATIVE EXAMPLE 4 | NOT EFFECTED | FAIR | FAIR | GOOD | FAIR |

IMAGE FORMING APPARATUS WITH LIGHT BEAM CONTROL

BACKGROUND OF THE INVENTION

1. Field of the Invention

The present invention relates to an image forming apparatus such as a copying machine, a laser beam printer and the like, utilizing an electrophotographic process for effecting image formation by means of an image forming, method using background area exposure for exposing a non-imaged portion.

2. Related Background Art

In recent years, an image forming apparatus such as a laser beam printer, a copying machine and the like utilizing an electrophotographic process has been noticed for its good image quality and its high speed print-out.

In general, as image forming apparatuses, two types, i.e., a digital type and an analogue type are known. An image forming system of the image forming apparatus of digital type can be generally divided into two methods, i.e., image area exposure method (referred to as "IAE" hereinafter) for exposing an imaged portion and background area exposure (referred to as "BAE"hereinafter) for exposing an non-imaged portion (background portion).

In the BAE, since developing is effected with respect to an area of a non-exposure portion where charges remain, normally, developer having charging polarity opposite to that of a photosensitive body is used. Since this relationship is the same as the image forming apparatus of analogue type, the BAE has a merit that a developing mechanism, a cleaning mechanism and developer can be commonly used to the image forming apparatus of analogue type.

On the other hand, in the IAE, since developing is effected with respect to an area where a charged amount is reduced by exposure, developer having the same charging polarity as that of the photosensitive body must be used to effect reversal developing. Although both BAE and IAE systems have been put to practical use, there is limitation due to the photosensitive body and developer used.

In general, microscopical defects are locally created on a surface of the photosensitive body, and, when such a photosensitive body is exposed, the charged amount on a surface of the photosensitive body may be locally reduced at such defect portions. In this case, in the IAE, since the developing is effected with respect to the area where the charged amount is reduced, the developer is also applied to the local defect portions, with the result that minute black spot noise of 0.1 mm or less may be generated in a white background.

To the contrary, in the BAE, since the developing is effected with respect to the area where the charges remain, the developer is not applied to the local defect portions, with the result that, although white void is generated in a black background, the white void is filled with the developer by pressure during a fixing operation, so that there is no problem regarding an outputted image. In this way, regarding the defect of the photosensitive body, the BAE has wider latitude than the IAE.

On the other hand, a transfer/separation ability greatly depends upon transferring efficiency, separating efficiency and latitude of re-transferring. In this case, in the IAE, since potential of the non-imaged portion (background portion) is greater than that in the imaged portion, the BAE has wider latitude than the IAE.

Further, when the cleaning is effected after the transferring, since the potential of the photosensitive body is attenuated, in the IAE system for effecting the developing with respect to the region having low potential, much developer is apt to be adhered to the photosensitive body at a cleaning station. Thus, regarding the cleaning, the BAE also has wider latitude than the IAE.

As mentioned above, the BAE has possibility that it can be designed more easily than the IAE and can provide a stable image forming apparatus having wide latitude.

However, in image formation utilizing light beam illumination, the disadvantage that the latitude of the BAE is made narrow for the following reason.

FIG. 11 shows, at its left half, a condition of one-line of the IAE, i.e., a condition that light beam is ON regarding one-line, and, at its right half, a condition of one-line of the BAE, i.e., a condition that light beam is OFF regarding one-line. In this case, the latitude $\Delta V1$ of the IAE is VD-Vi and the latitude $\Delta VH$ of the BAE is Vb-V2. Incidentally, V1 is a valley of potential ripple in the BAE and V2 is a top (mountain) of the potential ripple.

As can be seen from FIG. 11, in the BAE, if a spot diameter (diameter in $1/e^2$ of peak light amount) of the light beam is small with respect to a distance between pixels or if light beam power is too small, gap of potential is generated in the light beam illuminating portion, with the result that V2 is increased to make the latitude smaller. Thus, the spot diameter and power of the light beam with respect to the distance between the scanning lines have lower limits. That is to say, the latitude of the BAE becomes narrower than that of the IAE.

Considering co-ordinates (X, Y) having an X axis indicating a main scanning direction and a Y axis indication a sub scanning direction, according to a report regarding calculation of simulation of light energy distribution ("Investigation of Exposure System in Laser Beam Printer" (Vol. 26, No. 4) written by Naoto Kawamura and Michio Itoh and edited by Society of Electrophotography of Japan, 1987), it was found that, when a ratio between one pixel width a and a spot diameter W of the light beam is 1.6, an optimum condition is obtained.

However, in the electrophotographic process, an electrostatic latent image (image formed by static charge) on the photosensitive body is actually developed. Thus, the exposure amount distribution does not directly correspond to the image, and, therefore, even when the optimum exposure amount distribution is obtained, an optimum image is not always obtained. That is to say, only consideration of the relationship between the one pixel width and the spot diameter of the light beam is insufficient to obtain the optimum image.

SUMMARY OF THE INVENTION

An object of the present invention is to provide an image forming apparatus which can prevent fog and thinning of line in a device for exposing a non-imaged portion.

Another object of the present invention is to provide an image forming apparatus which can prevent light memory in a device for exposing a non-imaged portion.

A further object of the present invention is to provide an image forming apparatus comprising an image bearing body, charging means for charging the image bearing body, and exposing means for exposing the image bearing body charged by the charging means, wherein the exposing means illuminates a light beam for each of pixels corresponding to a pixel matrix having plural rows and plural columns, and, when it is assumed that a width of one pixel in the pixel matrix is A and a distribution width in a half value of a maximum potential value of potential distribution formed in OFF of light beam illumination of one pixel is Wv, a following relationship is satisfied:

$$0.6 < Wv/A < 1.4.$$

A still further object of the present invention is to provide an image forming apparatus comprising an image bearing body, charging means for charging or charging the image bearing body, and exposing means for exposing the image bearing body charged by the charging means, and wherein the exposing means illuminates a light beam for each of pixels corresponding to a pixel matrix having plural rows and plural columns, and, when it is assumed that a spot diameter in $1/e^2$ of a peak light amount of the light beam in light beam illumination of one pixel is We and a distribution width in a half value of a maximum potential value of potential distribution formed in OFF of light beam illumination of one pixel is Wv, a following relationship is satisfied:

$$0.5 < Wv/We < 1.5.$$

BRIEF DESCRIPTION OF THE DRAWINGS

FIG. 9 is a view showing evaluation results of fog, slim line image (thinning of line) and light memory between the embodiment and comparative example;

DETAILED DESCRIPTION OF THE PREFERRED EMBODIMENTS

Now, preferred embodiments of the present invention will be explained with reference to the accompanying drawings.

First Embodiment

Figure 1:
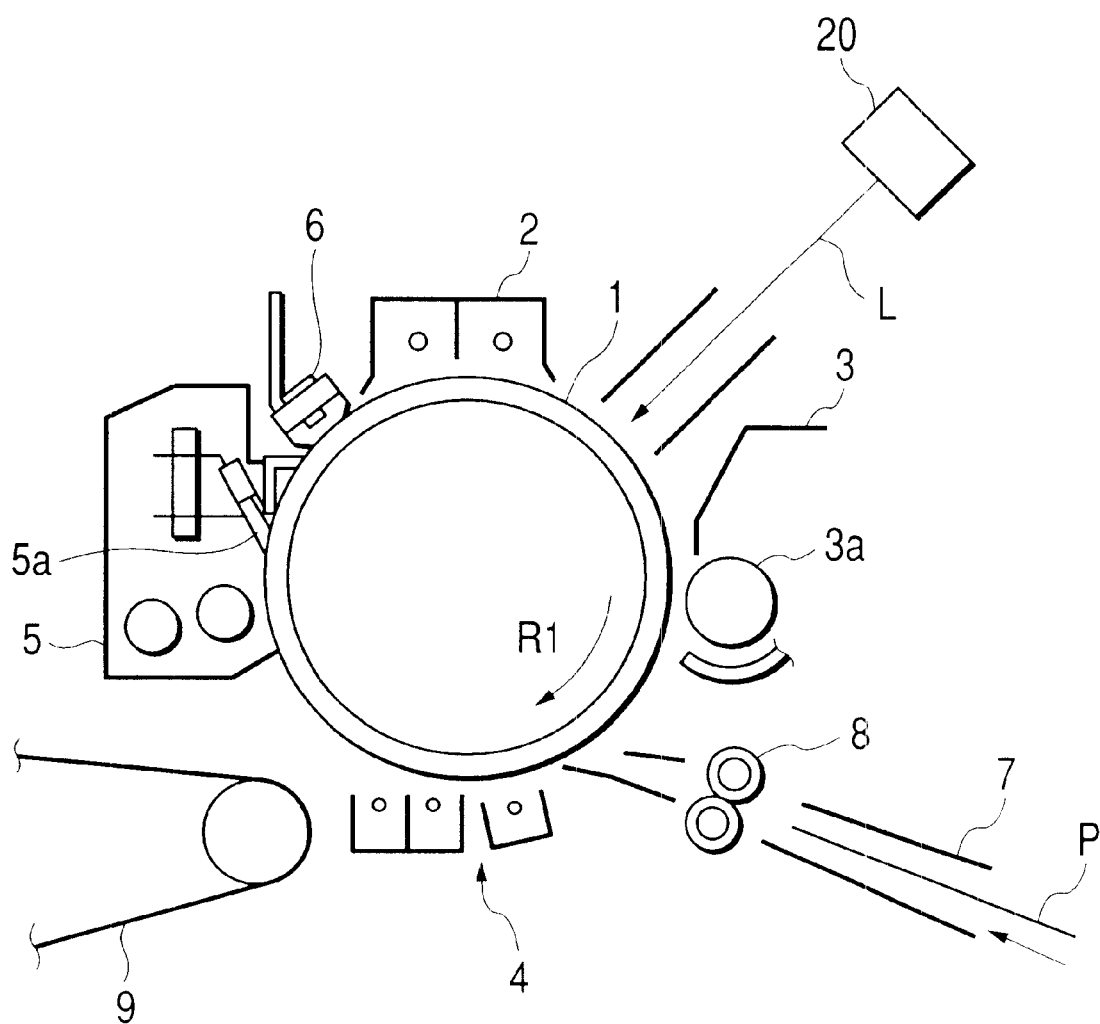
FIG. 1 is a view showing an image forming apparatus according to an embodiment of the present invention.

FIG. 1 is a schematic constructural view showing an image forming apparatus according to an embodiment of the present invention (digital copying machine or laser beam printer of electrophotographic type in the illustrated embodiment).

As shown in FIG. 1, around a cylindrical electrophotographic photosensitive body (referred merely to as "photo-graphic photosensitive body (referred merely to as "photo-sensitive body" hereinafter) 1 rotated in a direction R1 and extending in perpendicular to the plane of FIG. 1, there are disposed a primary charging device 2, a developing device 3, a transfer/separation charging device 4, a cleaning device 5, primary charge removal light source 6 and an exposing device 20.

In the illustrated embodiment, the photosensitive body 1 a negatively charged a-Si (amorphous silicon) photosensitive body and is rotated in the direction R1 at a predetermined peripheral speed. A surface of the photosensitive body 1 is uniformly charged by the primary charging device 2 with discharging.

The exposing device 20 serves to illuminate a light beam (laser beam) onto the surface of the uniformly charged photosensitive body 1 for each of pixels in a pixel matrix having plural rows and plural columns thereby to form an original image with BAE or an electrostatic latent image corresponding to an inputted image signal (details will be described later).

Next, an image forming operation of the image forming apparatus will be explained.

In the image forming operation, the photosensitive body 1 is uniformly charged by the primary charging device 2 to which charging bias is applied, and exposure L corresponding to image information of an original is effected with BAE by the exposing device 20 with respect to the charged photosensitive body 1, thereby forming the electrostatic latent image. Toner is adhered to the electrostatic latent image by a developing roller 3a of the developing device 3 to which developing bias is applied, thereby developing or visualized the latent image as a toner image.

When the toner image on the photosensitive body 1 reaches a transfer station between the transfer/separation charging device 4 and the photosensitive body 1, at this timing, a transfer material P as a recording material is conveyed to the transfer station through a transfer material supplying system including a transfer material passage 7 and a registration roller pair 8. At the transfer station, by the transfer/separation charging device 4 to which transfer bias having polarity opposite to that of the toner is applied, the toner image is transferred onto the transfer material. Thereafter, the transfer material P is separated from the surface of the photosensitive body 1.

The transfer material P to which the toner image was transferred is conveyed, through a conveying belt 9, to a fixing device (not shown), where the toner image is fixed to the transfer material P as a fixed image with heat and pressure in the fixing device (not shown). Then, the transfer material is discharged out of the apparatus.

On the other hand, residual toner not transferred at the transfer station and remaining on the surface of the photosensitive body 1 is cleaned by a cleaning blade 5a of the cleaning device 5, and charge is removed from the photosensitive body 1 renewed by such cleaning by means of the primary charge removal light source 6 for preparation for next image formation.

Next, the exposing device 20 according to the illustrated embodiment will be fully described.

Figure 2:
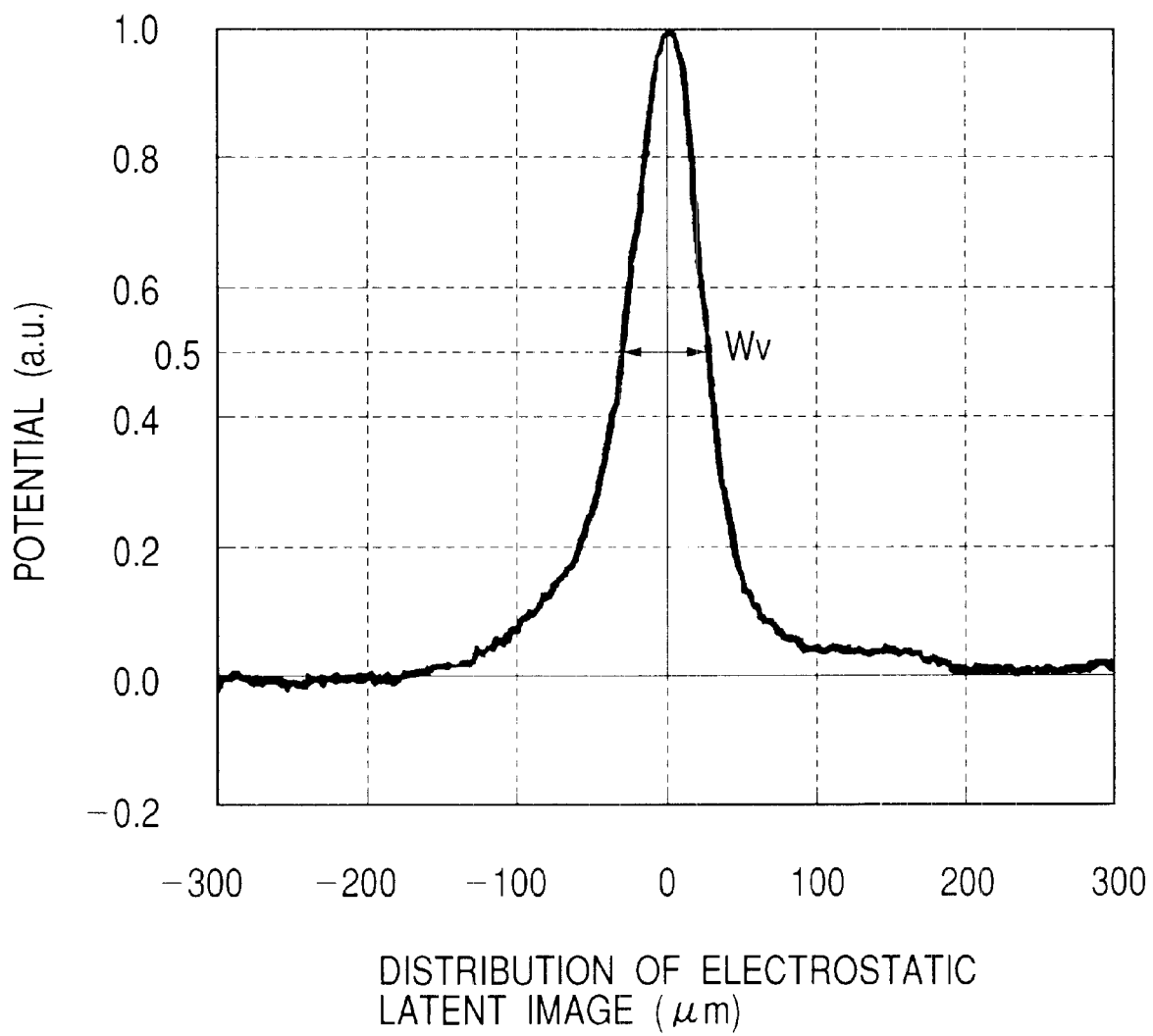
FIG. 2 is a view showing potential distribution created in OFF of light beam illumination of one pixel.

FIG. 2 shows a measurement result regarding electrostatic latent image distribution obtained when a one-dot electrostatic latent image is formed with the BAE (i.e., OFF of light mean only regarding one dot). In FIG. 2, the abscissa indicates a position of the electrostatic latent image distribution on the photosensitive body 1 and ordinate indicates latent image potential. As a method for measuring the electrostatic latent image distribution, for example, a method (latent image distribution measuring method) for electrically measuring the latent image distribution by using detecting electrodes, as disclosed in Japanese Patent Application No. 9-355009 (Japanese Patent Application Laid-Open No. 11-183542) was used.

Figure 3:
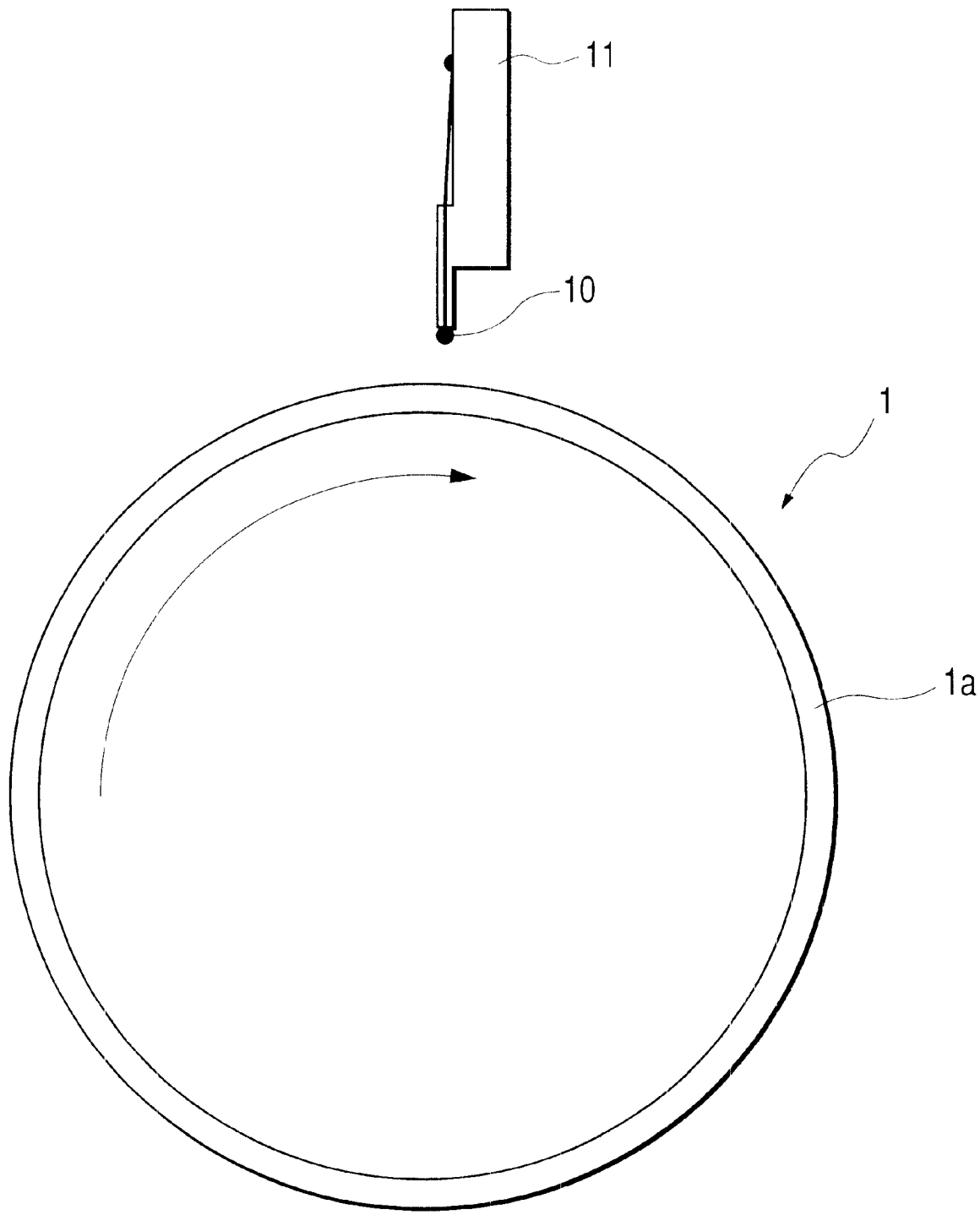
FIG. 3 is a view showing a method for measuring the potential distribution.
Figure 4:
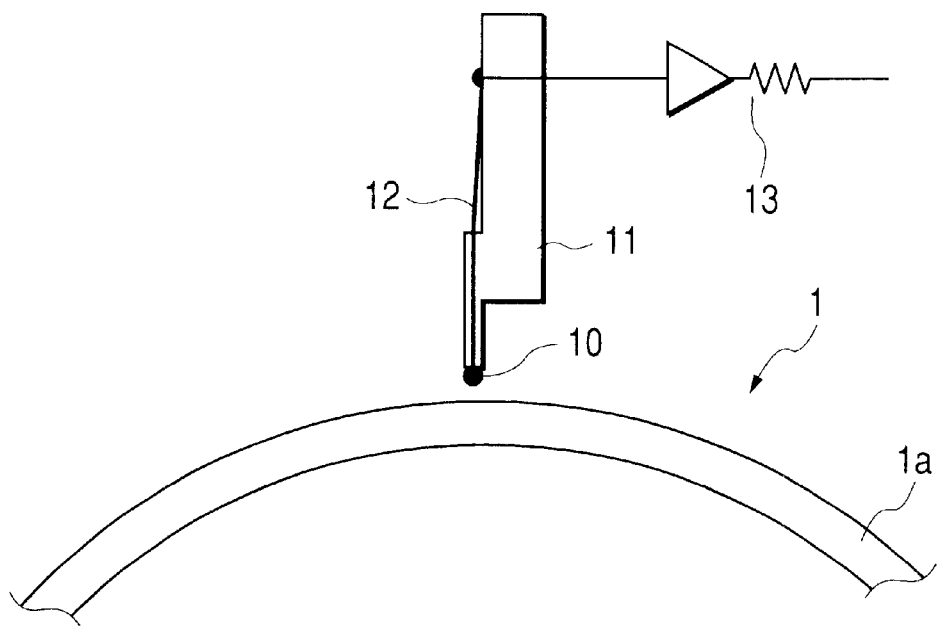
FIG. 4 is a view showing a potential sensor.
Figure 5:
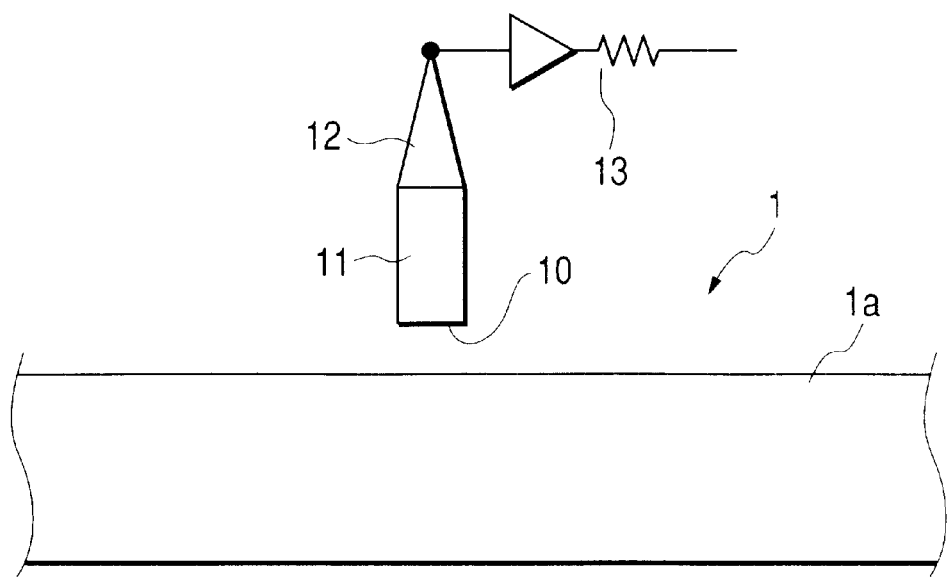
FIG. 5 is a view showing a potential sensor.

FIG. 3 is a schematic view of an electrostatic latent image distribution measuring apparatus for effecting such electrostatic latent image distribution measurement. In FIG. 3, the reference numeral 1a denotes a surface layer (a-Si photosensitive layer) which is subjected change in potential of the photosensitive body 1; and 10 denotes a potential sensor. The potential sensor 10 is supported at a distal end of a support 11, and, as shown in FIG. 4, the potential sensor 10 is connected to a circuit element 13 through a lead wire 12. Further, FIG. 5 is a schematic view looked at from the left in FIG. 4.

The electrostatic latent image distribution measurement effected by the electrostatic latent image distribution measuring apparatus is as follows.

If a relative movement is generated between the potential sensor 10 and the surface layer 1a of the photosensitive body 1 on which the electrostatic latent image was formed, induction current proportional to $dV/dt=(dV/dx)\cdot(dx/dt)$ is generated in the potential sensor 10 (where, dV is a charged amount of surface potential; dx/dt is a relative shifting speed between the potential sensor 10 and the photosensitive body 1).

Normally, since the relative shifting speed between the potential sensor 10 and the photosensitive body 1 is constant, the induction current detected by the potential sensor 10 includes information regarding inclination of the surface potential. By analyzing such information, the electrostatic latent image distribution can be measured.

The exposing device 20 according to the illustrated embodiment effects exposure by illuminating the light beam onto the photosensitive body 1 with such light beam spot diameter and (or) light beam light amount that the electrostatic latent image distribution measured by the electrostatic latent image distribution measuring apparatus is optimized.

Further, other than the above, as another electrostatic latent image distribution measuring methods, there is a method in which an electrostatic latent image is visualized by using developing means utilizing developer and the visualized image is evaluated to guess electrostatic latent image distribution before visualizing, and several methods for electrically evaluating change in potential on the surface the photosensitive body have been reported, as disclosed in Japanese Patent Application Laid-Open No. 5-508708. Even when such methods are used, the similar effected can naturally be obtained.

According to the Inventors' investigation, it was found that, regarding qualities of the electrostatic latent image distribution on the surface the photosensitive body and the developed image, an electrostatic, latent image width in the vicinity of a mid part between the non-exposed portion potential and the exposed portion potential well corresponds to the image, and such a width is a most important parameter. Thus, as shown in FIG. 2, a half value width in the electrostatic: latent image distribution of one-dot (a full width at.half maximum (F.W.H.M.)) is defined as a latent image width Wv.

In this way, by representing the latent image width Wv by the F.W.H.M., not by a width resulting in $1/e^2$ ($\cong 13.5\%$) of the electrostatic latent image distribution, it is possible to define it as a parameter more directly relating to the development.

Figure 6:
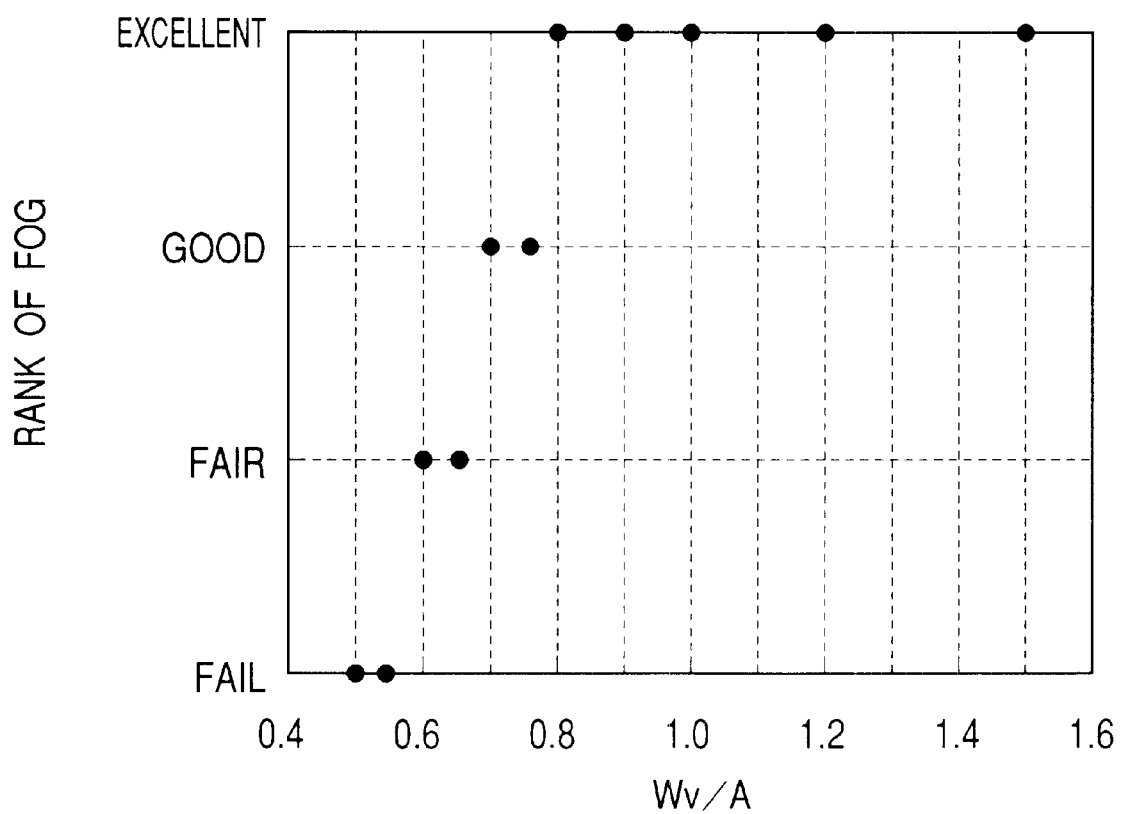
FIG. 6 is a view showing an evaluation result of fog regarding a ratio between a distribution width and a pixel width.

FIG. 6 shows a test result checking a relationship between rank of fog in the white image and the latent image width Wv. In FIG. 6, the abscissa indicates a ratio (=Wv/A) of the latent image width Wv to a one-pixel width A (a design value for image formation of an image forming apparatus), and the ordinate indicates the rank of fog.

As apparent from FIG. 6, as the value Wv/A is decreased, i.e., as the latent image width Wv is reduced, the fog is worsened, and, thus, the rank of fog is lowered. It is guessed that the reason is that the reduction of the latent image width Wv widens the gap of the latent image potential. Incidentally, in FIG. 6, "excellent" indicates "very good", "fair" indicates "no problem on practical use" and "fail" indicates "there is a problem on practical use".

From this rest result, regarding the fog, it was found that the value Wv is selected to preferably be not less than 0.6, and more preferably, not less than 0.7, and most preferably not less than 0.8.

In this way, in the illustrated embodiment, when the electrostatic latent image is formed on the photosensitive body 1 charged with the BAE for exposing the non-imaged portion (background portion) by using the exposing device 20, regarding the fog, by selecting the ratio (=Wv/A) of the latent image width Wv to the one-pixel width A to be preferably not less than 0.6 and more preferably not less than 0.7 and most preferably not less than 0.8, the adequate latitude of the image formation is maintained, thereby suppressing the fog to obtain the good image quality.

Next, a relationship between the latent image width Wv and thinning of the line width and thinning of the dot diameter.

Figure 7A:
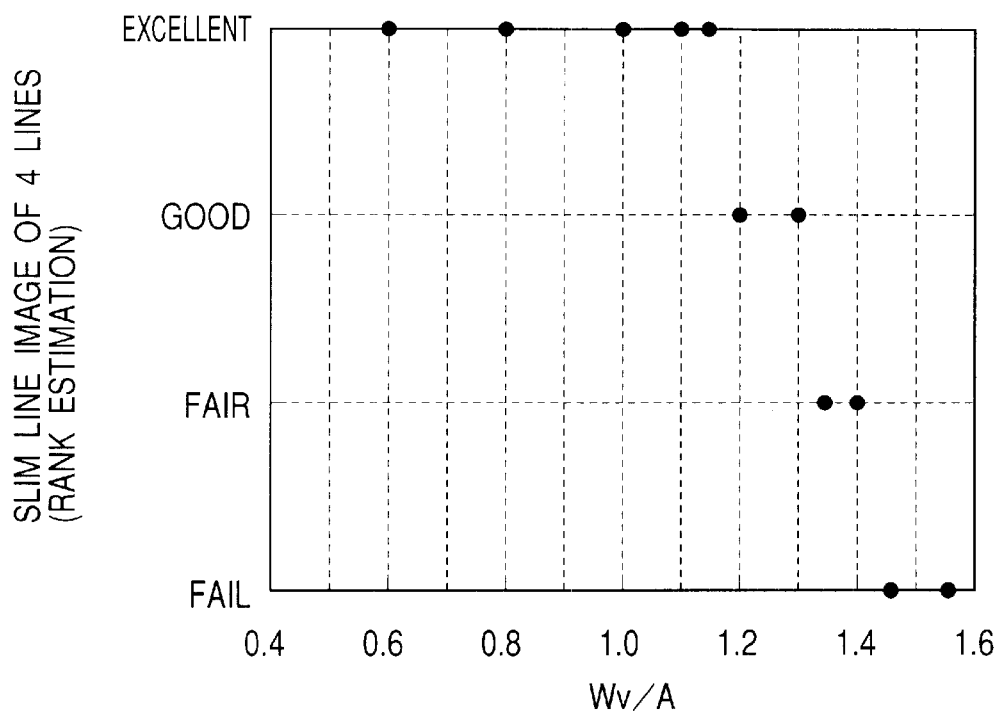
FIGS. 7A and 7B are views showing an evaluation result of thinning of line regarding a ratio between a distribution width and a pixel width.

FIG. 7A shows a test result regarding the relationship between the latent image width Wv and the thinning of the line width. In this test, regarding the output image obtained when the four-line latent image is formed, the thinning from the design value (corresponding to one-pixel width×4) was evaluated. In FIG. 7A, the abscissa indicates a ratio (=Wv/A) of the latent image width Wv to a one-pixel width A (a design value for image formation of an image forming apparatus), and the ordinate indicates the rank of the thinning (four-line thinning) from the design value.

Figure 7B:
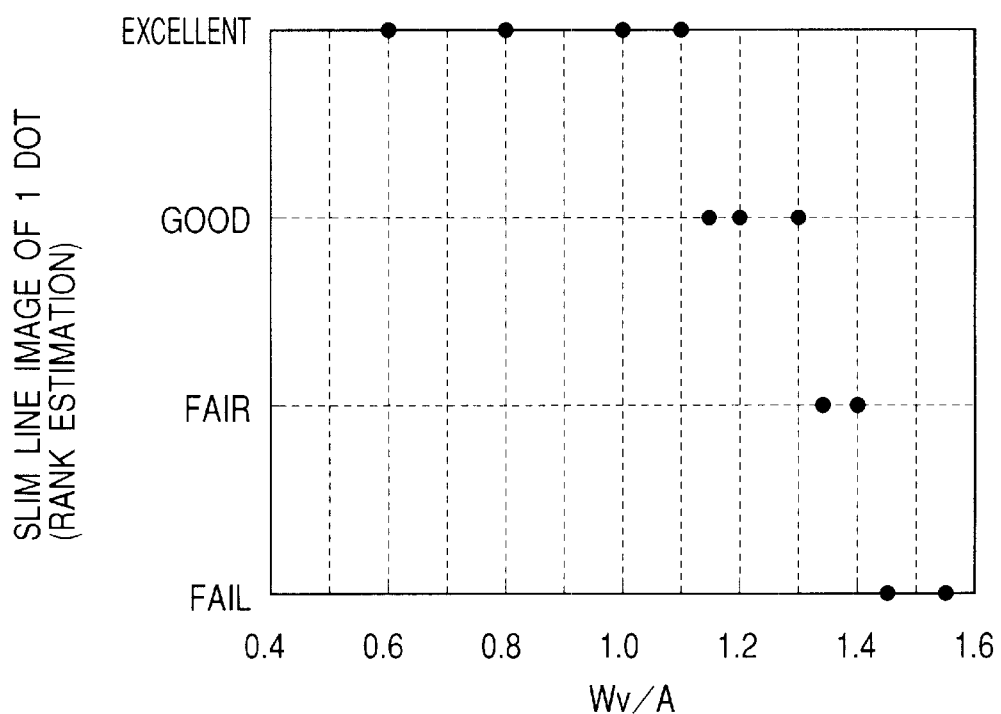

FIG. 7B shows a test result regarding the relationship between the latent image width Wv and the thinning of the one dot diameter. In this test, regarding the output image obtained when the one-dot latent image is formed, the thinning from the design value (corresponding to one pixel width) was evaluated. In FIG. 7B, the abscissa indicates a ratio (=Wv/A) of the latent image width Wv to a one-pixel width A (a design value for image formation of an image forming apparatus), and the ordinate indicates the rank of the thinning (one dot thinning) from the design value. Incidentally, in FIGS. 7A and 7B, regarding the evaluation of the rank, "excellent" indicates "very good", "fair" indicates "no problem on practical use" and "fail" indicates "there is a problem on practical use".

As apparent from FIGS. 7A and 7B, in case of the four-line latent image and in case of the one-dot latent image, as the value Wv/A is increased, i.e., as the latent image width Wv is widened, the line width and the dot diameter are thinned, thereby lowering the rank. From the test results, it was found that, regarding the thinning of the line width and the dot diameter, the value Wv/A is selected to be preferably not more than 1.4, and more preferably not more than 1.3 and most preferably not more than 1.1.

In this way, in the illustrated embodiment, when the electrostatic latent image is formed on the photosensitive body 1 charged with the BAE for exposing the non-imaged portion (background portion) by using the exposing device 20, regarding the thinning of the line width and the dot diameter, by selecting the ratio (=Wv/A) of the latent image width Wv to the one-pixel width A to be preferably not more than 1.4, and more preferably not more than 1.3 and most preferably not more than 1.1, the adequate latitude of the image formation is maintained, thereby suppressing the thinning of the line width and the dot diameter to obtain the good image quality. Thus, in the illustrated embodiment, by setting to $0.6 \leq Wv/A \leq 1.4$, a good image not having the fog and "the thinning of line" can be formed.

Second Embodiment

Also in a second embodiment of the present invention, an image forming apparatus similar to that in the first embodiment was used, and the relationship between the spot diameter (diameter in $1/e^2$ of the peak light amount) We of the light beam (laser beam emitted from the exposing device 20), the latent image width Wv and the light memory was checked on the basis of the electrostatic latent image distribution measuring results (refer to FIG. 2) obtained by the electrostatic latent image distribution measuring device shown in FIGS. 3 to 5.

Figure 8:
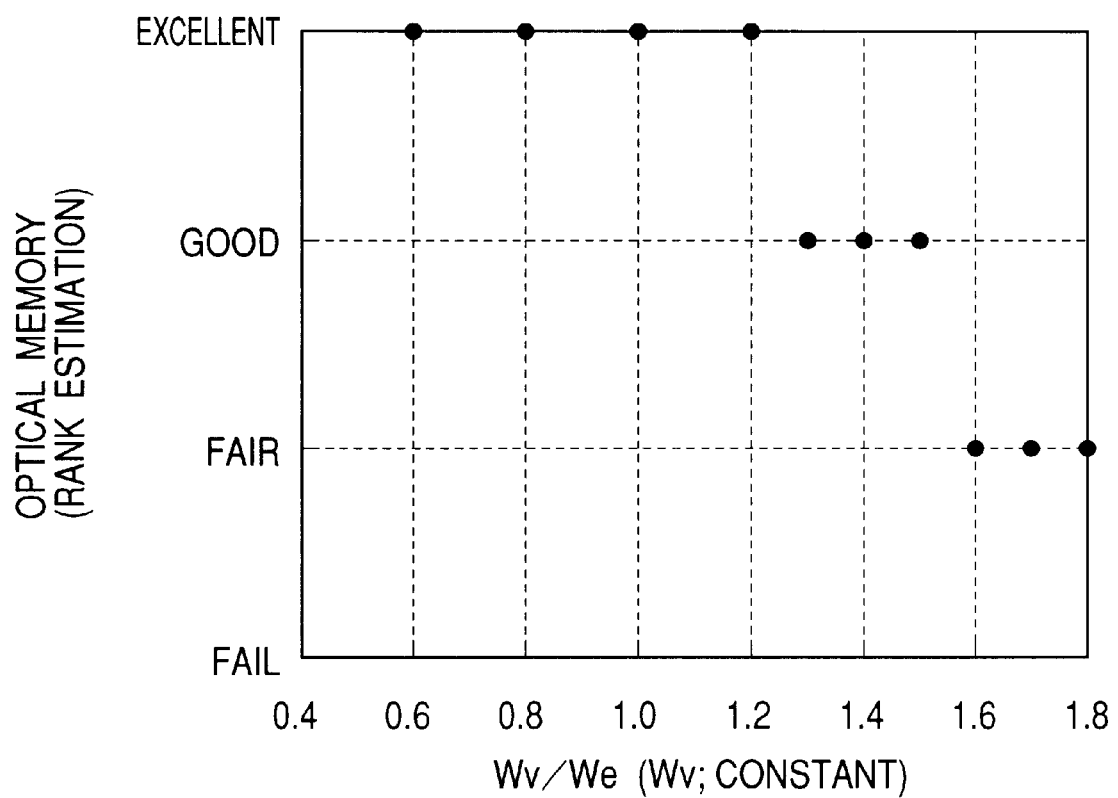
FIG. 8 is a view showing an evaluation result of light memory regarding a ratio between a distribution width and a spot diameter.

FIG. 8 shows a test result checking a relationship between rank of the light memory and a ratio (=Wv/We) between the latent image width Wv and the spot diameter We of the light beam. In FIG. 8, the abscissa indicates the ratio (=Wv/We) of the latent image width Wv to the spot diameter We of the light beam and the ordinate indicates the rank of the light memory.

Regarding the ratio (=Wv/We) between the latent image width Wv and the spot diameter We of the light beam, the latent image width Wv was changed by firstly changing the spot diameter We of the light beam by appropriately adjusting the optical system and then by adjusting the light amount of the light beam so that the latent image width Wv becomes always constant. Regarding light memory, a chart obtained by overlapping a character chart (FY9-9040-000 of Canon Inc.) and an intermediate gradation chart (FY9-9042-020 of Canon Inc.) was used as an original and an output image was evaluated.

Under the test condition shown in FIG. 8, the value Wv/We could not be set to be smaller than 0.5. Further, since the latent image width Wv (i.e., the ratio (Wv/A) of the latent image width Wv to one-pixel width A) was set to be constant, significant difference regarding the fog and the thinning of line width and dot diameter was not observed. However, as apparent from FIG. 8, as the ratio (=Wv/We) of the latent image width Wv to the spot diameter We of the light beam is increased, i.e., as the spot diameter We of the light beam is increased, the light memory is increased, thereby lowering the rank. Incidentally, in FIG. 8, regarding the evaluation of the rank, "excellent" indicates "very good", "fair" indicates "no problem on practical use" and "fail" indicates "there is a problem on practical use ".

From the test result, regarding the light memory, it was found that the value is set to be preferably not more than 1.5 and more preferably not more than 1.2.

In this way, in the illustrated embodiment, when the electrostatic latent image is formed on the photosensitive body 1 charged with the BAE for exposing the non-imaged portion (background portion) by using the exposing device 20, regarding the light memory, by selecting the ratio (=Wv/We) of the latent image width Wv to the spot diameter We of the light beam to be preferably not more than 1.5 and more preferably not more than 1.2, the light memory is greatly reduced, thereby obtaining a high quality image.

Next, regarding the present invention, the fog, the thinning of line (line width and dot diameter) and the light memory were evaluated on the basis of the following examples 1 to 4 and comparative examples 1 to 4.

EXAMPLE 1

Also in this example 1, the image forming apparatus (electrophotographic digital copying machine or laser beam printer) of the first embodiment was used. The image forming system was BAE (background area exposure), the light beam light source of the exposing device was a laser beam, and the photosensitive body was a-Si photosensitive body.

In this example, under a condition that the ratio (Wv/A) of the, latent image width Wv to one-pixel width A was selected to 1.0 and the ratio (=Wv/We) of the latent image width Wv to the spot diameter We of the light beam was selected to 0.7, the fog, the thinning of the line width and the dot diameter, and the light memory were evaluated. The evaluating method is the same as those in the above-mentioned embodiments.

As apparent from an evaluation result shown in FIG. 9, the evaluation of the fog, the thinning of the line width and the dot diameter, and the light memory in the system of this example was excellent.

EXAMPLE 2

In this example 2, an OPC photosensitive body is used as the photosensitive body and the other was the same as the apparatus of the example 1. And, under a condition that the ratio (Wv/A) of the latent image width Wv to one-pixel width A was selected to 1.1 and the ratio (=Wv/We) of the latent image width Wv to the spot diameter We of the light beam was selected to 0.9, the fog, the thinning of the line width and the dot diameter, and the light memory were evaluated. The evaluating method is the same as those in the above-mentioned embodiments.

As apparent from an evaluation result shown in FIG. 9, in the system of this example, the evaluation of the fog was excellent, and the evaluation of the thinning of the line width and the dot diameter, and the light memory was good.

EXAMPLE 3

In this example 3, an LED was used as the light beam light source of the exposing apparatus and the other was the same as the apparatus of the example 1. And, under a condition that the ratio (Wv/A) of the latent image width Wv to one-pixel width A was selected to 1.0 and the ratio (=Wv/We) of the latent image width Wv to the spot diameter We of the light beam was selected to 0.7, the fog, the thinning of the line width and the.dot diameter, and the light memory were evaluated. The evaluating method is the same as those in the above-mentioned embodiments.

As apparent from an evaluation result shown in FIG. 9, the evaluation of the fog, the thinning of the line width and the dot diameter, and the light memory in the system of this example was good.

EXAMPLE 4

In this example 4, in the image forming apparatus of the example 1, the spot diameter of the light beam and the light amount of the light beam could be controlled to optimize the electrostatic latent image potential distribution by effecting feedback of the latent image distribution measuring result. More specifically, the spot diameter of the light beam was adjusted by adjusting a diaphragm of the optical system and the light amount of the light beam was adjusted by changing a current value of the laser as the light source. By using this apparatus, the fog, the thinning of the line width and the dot diameter, and the light memory were evaluated. The evaluating method is the same as those, in the above-mentioned embodiments.

Figures 10, 11:
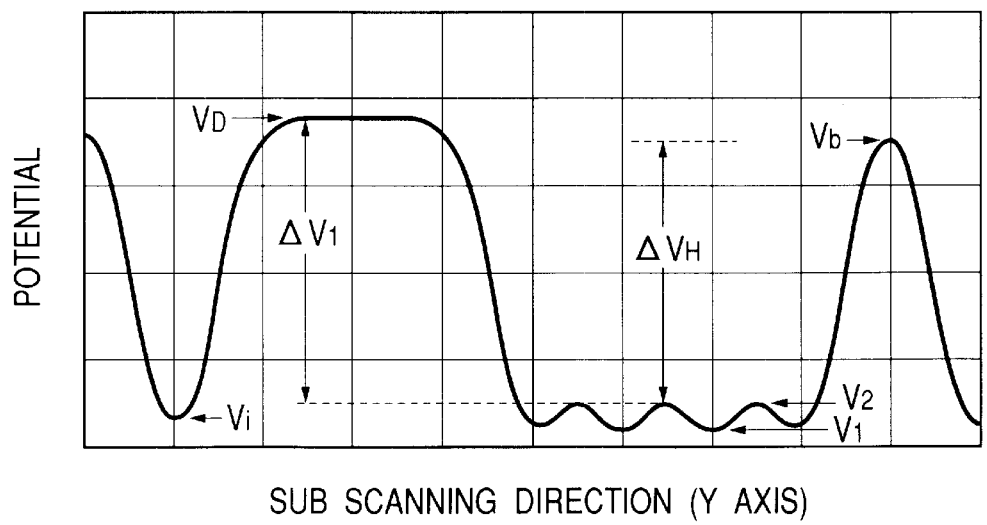
FIG. 10 is a view showing evaluation results of fog, thinning of line and light memory between the embodiment and a comparative example.
FIG. 11 is a view showing potential distribution in imaged portion exposure and non-imaged portion exposure.

As apparent from an evaluation result shown in FIG. 10, the evaluation of the fog, the thinning of the line width and the dot diameter, and the light memory in the system of this example was excellent.

COMPARATIVE EXAMPLE 1

In a comparative example 1, the image forming apparatus of the example 1 was used, and, under a condition that the ratio (Wv/A) of the latent image width Wv to one-pixel width A was selected to 0.4 and the ratio (=Wv/We) of the latent image width Wv to the spot diameter We of the light beam was selected to 0.7, the fog, the thinning of the line width and the dot diameter, and the light memory were evaluated. The evaluating method is the same as those in the abovementioned embodiments.

As apparent from an evaluation result shown in FIG. 9, the evaluation of the thinning of the line width and the dot diameter, and the light memory in the system of this example was excellent, but, the evaluation of the fog was that there was a problem on practical use (fail).

COMPARATIVE EXAMPLE 2

In a comparative example 2, the image forming apparatus of the example 1 was used, and, under a condition that the ratio (Wv/A) of the latent image width Wv to one-pixel width A was selected to 1.6 and the ratio (=Wv/We) of the latent image width Wv to the spot diameter We of the light beam was selected to 0.7, the fog, the thinning of the line width and the dot diameter, and the light memory were evaluated. The evaluating method is the same as those in the above-mentioned embodiments.

As apparent from an evaluation result shown in FIG. 9, the evaluation of the fog and the light memory in the system of this example was excellent, but, the evaluation of the thinning of the line width and the dot diameter was fail.

COMPARATIVE EXAMPLE 3

In a comparative example 3, the image forming apparatus of the example 1 was used, and, under a condition that the ratio (Wv/A) of the latent image width Wv to one-pixel width A was selected to 1.0 and the ratio (=Wv/We) of the latent image width Wv to the spot diameter We of the light beam was selected to 1.8, the fog, the thinning of the line width and the dot diameter, and the light memory were evaluated. The evaluating method is the same as those in the above-mentioned embodiments.

As apparent from an evaluation result shown in FIG. 9, the evaluation of the fog and the thinning of the line width and the dot diameter in the system of this example was excellent, but, the evaluation of the light memory was slightly worse.

COMPARATIVE EXAMPLE 4

In a comparative example 4, in the image forming apparatus of the example 4, the spot diameter of the light beam and the light amount of the light beam were not controlled to optimize the electrostatic latent image potential distribution, and the fog, the thinning of the line width and the dot diameter, and the light memory were evaluated. The evaluating method is the same as those in the above-mentioned embodiments.

As apparent from an evaluation result shown in FIG. 10, the evaluation of the light memory in the system of this example was excellent but the evaluation of the fog and the thinning of the line width and the dot diameter was slightly worse.

In this way, in the example 1 to 4 of the present invention, the evaluation of the fog, the thinning of the line width and the dot diameter, and the light memory was excellent or good, and, thus, the adequate latitude of the image formation was maintained, thereby obtaining the optimum image.

As mentioned above, according to the present invention, when the background area exposure for exposing the non-imaged portion is used, by effecting exposure on the electrostatic latent image bearing body with light beam illumination so that the ratio (=Wv/A) of the full width at half maximum Wv of the electrostatic latent image potential distribution to the one-pixel width A satisfies the relationship $0.6 \leq Wv/A \leq 1.4$, the adequate latitude of the image formation can be maintained, thereby obtaining the optimum image not having the fog and thinning of line.

Further, in the case where the background area exposure for exposing the non-imaged portion is used, when it is assumed that the full width at half maximum of the electrostatic latent image potential distribution formed during the light beam illumination of one pixel Wv, by effecting exposure on the electrostatic latent image bearing body with light beam illumination so that the ratio (=Wv/We) of the full width at half maximum Wv of the electrostatic latent image potential distribution to the spot diameter We of the light beam satisfies the relationship $0.5 \leq Wv/We \leq 1.5$, the light memory can be greatly reduced, thereby obtaining a higher quality image.

While the present invention was explained in connection with the above-mentioned embodiments, the present invention is not limited to such embodiments, but various alterations can be made within the scope of the invention.

What is claimed is:

1. An image forming apparatus comprising:

an image bearing body;

charging means for charging said image bearing body; and exposing means for exposing said image bearing body charged by said charging means, wherein said exposing means illuminates with a light beam each pixel corresponding to a non-image portion of a pixel matrix having plural rows and plural columns, and wherein, when it is assumed that a width of one pixel in the pixel matrix is A and a distribution width in a half value of a maximum potential value of a potential distribution formed without illumination by the light beam of one pixel is Wv, the following relationship is satisfied:

$$0.6 \leq Wv/A \leq 1.4,$$

wherein said image forming apparatus further comprises control means for measuring the potential distribution and for controlling a spot diameter of the light beam and/or a light amount of the light beam.

2. An image forming apparatus according to claim 1, wherein said image bearing body is an a-Si type photosensitive body.

3. An image forming apparatus according to claim 1, wherein the light beam is a laser beam.

4. An image forming apparatus comprising:

an image bearing body;

charging means for charging said image bearing body; and exposing means for exposing said image bearing body charged by said charging means, wherein said exposing means illuminates with a light beam each pixel corresponding to a non-image portion of a pixel matrix having plural rows and plural columns, and wherein, when it is assumed that a spot diameter in $1/e^2$ of a peak light amount of the light beam in light beam illumination of one pixel is We and a distribution width in a half value of a maximum potential value of a potential distribution formed without illumination by the light beam of one pixel is Wv, the following relationship is satisfied:

$$0.5 \leq Wv/We \leq 1.5.$$

5. An image forming apparatus according to claim 4, further comprising control means for measuring the potential distribution and for controlling a spot diameter of the light beam and/or a light amount of the light beam.

6. An image forming apparatus according to claim 4, wherein said image body is an a-Si type photosensitive body.

7. An image forming apparatus according to claim 4, wherein the light beam is a laser beam.

8. An image forming apparatus according to claim 4, wherein when it is assumed that a width of one pixel in the pixel matrix is A and a distribution width in a half value of a maximum potential value of a potential distribution formed without illumination by the light beam of one pixel is Wv, the following relationship is satisfied:

$$0.6 \leq Wv/A \leq 1.4.$$

* * * * *

UNITED STATES PATENT AND TRADEMARK OFFICE
CERTIFICATE OF CORRECTION

PATENT NO. : 6,529,223 B2
DATED : March 4, 2003
INVENTOR(S) : Hironori Ohwaki et al.

It is certified that error appears in the above-identified patent and that said Letters Patent is hereby corrected as shown below:

Column 1,
Line 10, "forming," should read -- forming --.

Column 2,
Line 10, "that" should read -- is that --.

Column 3,
Line 5, "$0.6<Wv/A<1.4.$" should read -- $0.6 \leq Wv/A \leq 1.4.$ --; and
Line 22, "$0.5<Wv/We<1.5.$" should read -- $0.5 \leq Wv/We \leq 1.5.$ --.

Column 4,
Line 31, "visualized" should read -- visualizing --.

Column 5,
Line 59, "electrostatic:" should read -- electrostatic --.

Column 8,
Line 55, "the.dot" should read -- the dot --.

Column 9,
Line 9, "those," should read -- those --; and
Line 25, "abovementioned" should read -- above-mentioned --.

Column 10,
Line 1, "and-the" should read -- and the --.

UNITED STATES PATENT AND TRADEMARK OFFICE
CERTIFICATE OF CORRECTION

PATENT NO.    : 6,529,223 B2
DATED         : March 4, 2003
INVENTOR(S)   : Hironori Ohwaki et al.

It is certified that error appears in the above-identified patent and that said Letters Patent is hereby corrected as shown below:

Column 12,
Line 11, "image body" should read -- image bearing body --.

Signed and Sealed this

Eleventh Day of November, 2003

JAMES E. ROGAN
*Director of the United States Patent and Trademark Office*